(12) United States Patent
Horiuchi et al.

(10) Patent No.: US 7,497,464 B2
(45) Date of Patent: Mar. 3, 2009

(54) VEHICLE-USE AIR BAG MODULE (75) Inventors: Tadanori Horiuchi, Saitama (JP); Haruka Tsuda, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/705,432

(22) Filed: Feb. 13, 2007

(65) Prior Publication Data
US 2007/0187931 A1 Aug. 16, 2007

(30) Foreign Application Priority Data
Feb. 14, 2006 (JP) ............................. 2006-037085

(51) Int. Cl.
*B60R 21/16* (2006.01)
(52) U.S. Cl. ............... 280/730.1; 280/728.2; 280/728.3
(58) Field of Classification Search .............. 280/728.1, 280/278.2, 728.3, 730.1, 732
See application file for complete search history.

(56) References Cited

U.S. PATENT DOCUMENTS

| | | | |
|---|---|---|---|
| 5,482,313 A * | 1/1996 | Ikeya et al. ............... 280/728.2 |
| 6,250,669 B1 * | 6/2001 | Ohmiya ...................... 280/732 |
| 6,543,802 B1 * | 4/2003 | Uchiyama et al. ......... 280/728.2 |
| 2002/0063415 A1 * | 5/2002 | Uchiyama et al. ........ 280/728.2 |
| 2006/0131844 A1 * | 6/2006 | Trevino et al. ........... 280/728.3 |
| 2006/0214399 A1 * | 9/2006 | Okamoto et al. ......... 280/728.3 |

FOREIGN PATENT DOCUMENTS

JP       2001-63504 A     3/2001

* cited by examiner

*Primary Examiner*—John Q. Nguyen
*Assistant Examiner*—Robert A. Coker
(74) *Attorney, Agent, or Firm*—Birch, Stewart, Kolasch & Birch, LLP (57) ABSTRACT

A vehicle-use air bag module which hardly exerts influence on a side end portion of a module cover even when an external force or heat is applied to the module cover. Ribs are formed on side end portions in the left and right direction of a top plate member of a module cover and are brought into contact with an upper surface portion of a bracket having an approximately L-shape. The bracket is integrally fixed together with the right extending portion having a side tear line and a right side wall of a casing in which an air bag is stored using rivets. A lower end portion of a support portion of the rib is supported on an upper surface portion of the bracket. The side end portion is prevented from being deformed even when an external force is applied from the direction indicated by an arrow C.

23 Claims, 6 Drawing Sheets

VEHICLE-USE AIR BAG MODULE

CROSS-REFERENCE TO RELATED APPLICATIONS

The present application claims priority under 35 USC 119 to Japanese Patent Application No. 2006-037085 filed on Feb. 14, 2006 the entire contents of which are hereby incorporated by reference.

BACKGROUND OF THE INVENTION

1. Field of the Invention

The present invention relates to a vehicle-use air bag module, and more particularly to a vehicle-use air bag module which hardly exerts influence on a side end portion of a module cover even when an external force or heat is applied to the module cover.

2. Description of Background Art

Conventionally, the optimum structure of an air bag module for integrally housing a folded air bag and an inflator for inflating and deploying the air bag has been studied. As an example, a structure is known for housing the air bag and the inflator in a casing made of metal or the like. An opening portion of the casing is covered with a module cover made of a resin or the like. Usually, such a module cover is configured such that a tear line which constitutes a fragile portion is formed in a top plate member thereof. When the inflator is operated, the tear line is broken thus inflating and developing the air bag.

JP-A-2001-63504 discloses an air bag module formed by overlapping a side wall of the casing and a plate-like portion extending downwardly from a side end portion of the module cover. Both members are joined using rivets.

In mounting the air bag module on a motorcycle, to protect the tear line from moisture, dust or an unpredicted external force or the like, the tear line may be formed in the above-mentioned plate-like portion in place of the top plate member. Further, by constituting the air bag module such that the side end portion of the module cover extends outwardly and the side end portion is engaged with a neighboring exterior part, the tear line is concealed from the outside. Thus, the tear line protective effect can be further enhanced. However, the simple outward extension of the side end portion is liable to easily lower the rigidity of the extended portion. Thus, it is desirable to take the influence such as an external force or heat on the side end portion into consideration. However, JP-A-2001-63504 fails to suggest the above-mentioned task.

SUMMARY AND OBJECTS OF THE INVENTION

Accordingly, it is an object of the invention to provide a vehicle-use air bag module which can overcome the above-mentioned drawbacks of the related art and hardly exerts an influence on a side end portion of a module cover even when an external force or heat is applied to the module cover.

To achieve the above-mentioned object, an embodiment of the invention lies in providing a vehicle-use air bag module which includes a casing for housing an air bag and a module cover for covering an opening portion of the casing. The vehicle-use air bag module further includes a plate-like extending portion mounted on a back surface side of the module cover in an erected manner with a tear line. A side end portion of the module cover is expanded to the outside of the extending portion in the vehicle width direction. A bracket is provided for supporting the side end portion from below. The extending portion, the bracket and a side wall of the casing are joined to each other.

An embodiment of the invention lies in that a plate-like rib is formed to be approximately parallel to the extending portion and is brought into contact with an upper surface side of the bracket that is mounted on the side end portion.

An embodiment of the invention lies in providing a plurality of ribs mounted on the side end portion.

An embodiment of the invention lies in the joining of the extending portion, the bracket and the side wall of the casing that is performed by caulking and by using rivets.

An embodiment of the invention lies in the joining using rivets that is performed at a plurality of portions.

An embodiment of the invention lies in the ribs that are arranged in symmetry at the left and right side end portions of the module cover.

An embodiment of the invention lies in that the eaves member that is mounted on a side periphery of the rib wherein the eaves members are configured to be in contact with a surface of a backside of an exterior part adjacent to the module cover According to an embodiment of the invention, the side end portion of the module cover is supported by the bracket which is joined to the extending portion and the side wall of the casing from below. Thus, even when an unpredicted external force or heat is applied to the side end portion of the module cover, it is possible to acquire the air bag module which hardly exerts influence on the module cover.

According to an embodiment of the invention, due to the simple construction which forms the side end portion of the module cover in a plate-like shape substantially parallel to the extending portion, it is possible to obtain the ribs which effectively support the side end portion.

According to an embodiment of the invention, the side end portion of the top plate member is supported by the plurality of ribs. Thus, the whole area of the side end portion can be stably supported.

According to an embodiment of the invention, the extending portion, the bracket and the side wall of the casing are joined to each other by caulking using the rivets. Thus, it is possible to enhance the mounting accuracy of the bracket with a simple construction.

According to an embodiment of the invention, by fixing the bracket using the plurality of rivets, the mounting accuracy of the bracket can be easily managed. Thus, the arrangement accuracy of the side end portion can be enhanced. Along with the enhancement of the arrangement accuracy of the side end portion, the size accuracy of a mating surface of the bracket with an exterior part adjacent to the module cover can be enhanced. Thus, the appearance of the exterior part can be enhanced.

According to an embodiment of the invention, an advantageous effect that the side end portion of the module cover is hardly influenced even when the unpredicted external force or heat is applied to the module cover can be uniformly obtained at left and right side end portions.

According to an embodiment of the invention, the eaves-like member is brought into contact with the back surface of the exterior part adjacent to the module cover. Thus, the size accuracy of a mating surface can be enhanced thus firmly preventing the intrusion of moisture and dust.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
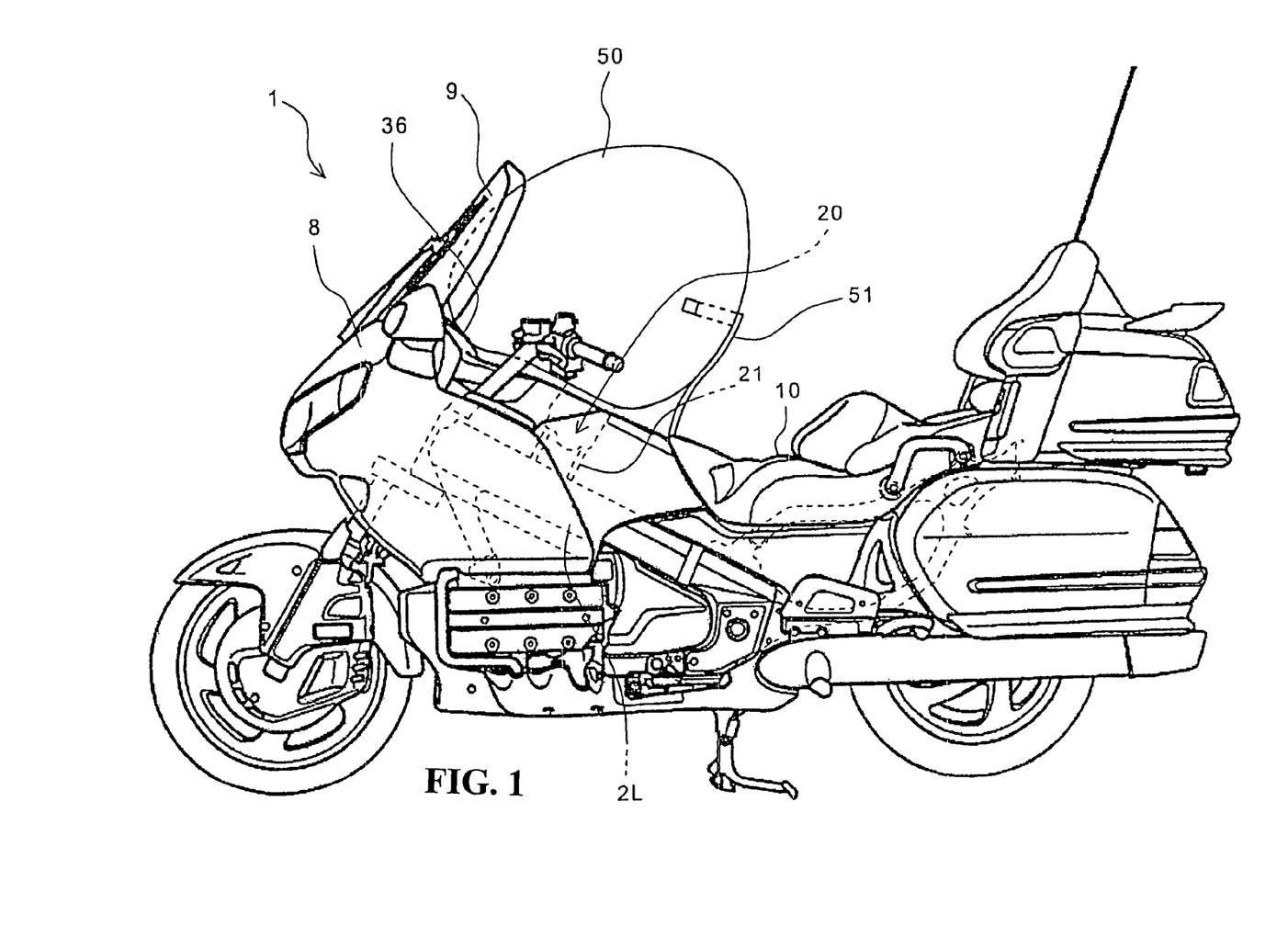
FIG. 1 is a side view of a motorcycle according to one embodiment of the invention.

Hereinafter, a preferred embodiment of the invention is explained in detail in conjunction with the drawings. FIG. 1 is a schematic explanatory view of a motorcycle 1 to which an air bag module according to one embodiment of the invention is applied. The motorcycle 1 according to this embodiment is provided with an air bag 50 which is, when an impact of a predetermined value or more is applied to the vehicle body, inflated and deployed into an approximately spherical body having a size which brings the air bag 50 into contact with a meter case 36 from above a main sheet 10 and allows the air bag 50 to reach the vicinity of a window screen 9 which is formed on an upper end portion of an upper cowl 8. An air bag module 20 integrally stores the air bag 50. An inflator is provided (see FIG. 5) for generating a gas for inflating and deploying the air bag 50. The inflator is fixed to upper tubes 2L, 2R which constitute a main frame of the motorcycle 1 using a support stay 21 at positions closer to the vehicle body front portion than a sitting position of a rider. Support belts 51 are connected to a rear portion of the air bag 50 to function to hold the air bag 50 at an appropriate position for effectively constraining the rider.

Figure 2:
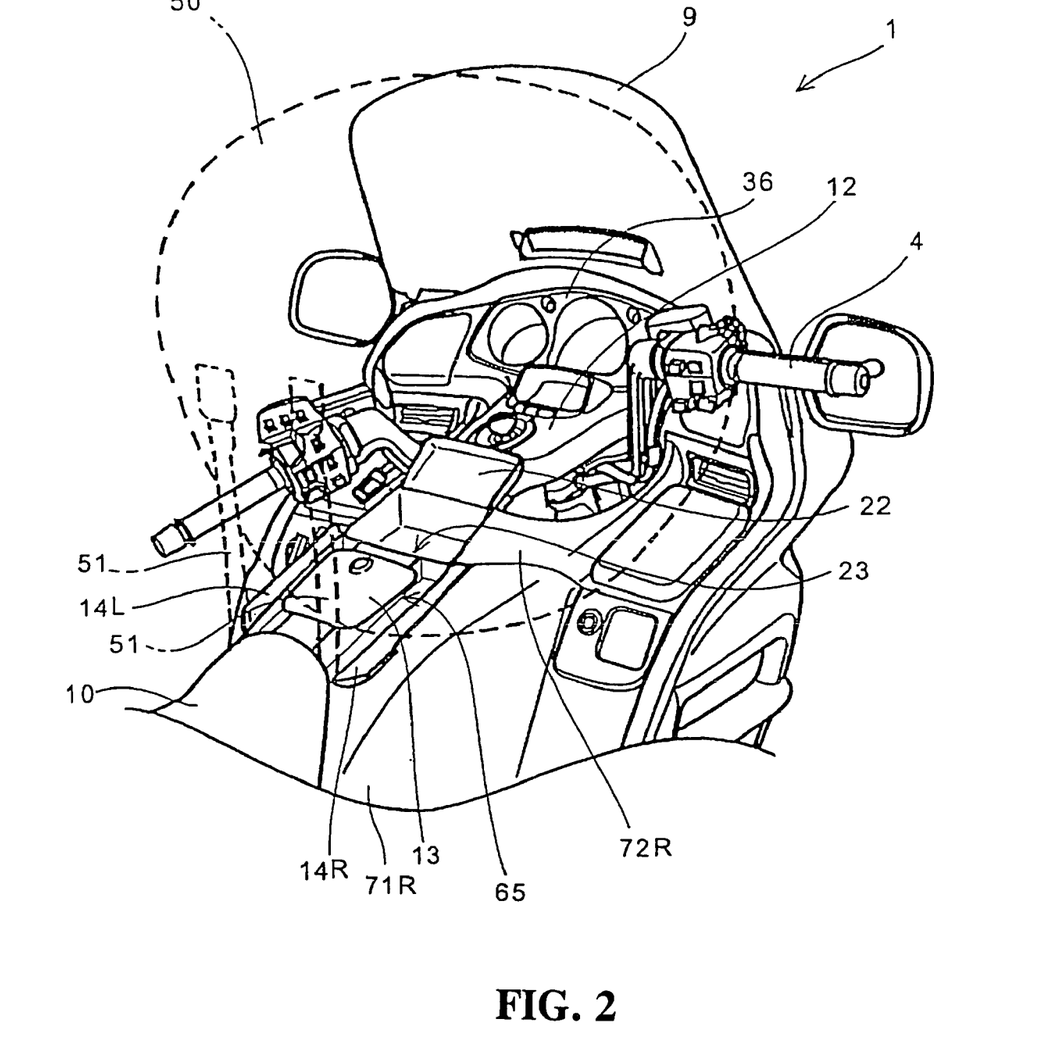
FIG. 2 is a partially enlarged view of the motorcycle according to the one embodiment of the invention.

FIG. 2 is a partially enlarged view of the motorcycle 1 according to one embodiment of the invention. The symbols equal to the symbols used above indicate parts identical or similar to the parts described above. The air bag module 20 (see FIG. 1) is configured such that the inflator and the folded air bag 50 are stored in a box-like casing 23 and an upper portion thereof is covered with a module cover 22. The mounting position of the air bag module 20 is arranged between an ignition cover 12 for covering a top bridge for connecting left and right handles 4 and a filling-port lid 13 arranged above a fuel tank. Further, the air bag module 20 is configured such that, when the air bag 50 is inflated and deployed, a gas from the inflator is immediately supplied to the air bag 50 and, due to the pressure of the gas, the module cover 22 is opened about one side on a vehicle body front side as an axis of rotation. Both side end portions of the module cover 22 are configured such that, in a normal state before the air bag 50 is inflated and deployed, the side end portions are engaged with end portions of a left front shelter 72L (see FIG. 3) and a right front shelter 72R which are respectively arranged adjacent to left and right in the vehicle width direction.

The support belts 51 are stored in storing spaces 65 below the belt covers 14L, 14R in a folded manner in a normal state and are configured to be deployed into a state indicated by a broken line in FIG. 2 upon the inflation and deployment of the air bag 50 while forcibly opening the belt covers 14L, 14R in both left and right directions. The lower end portion of the support belts 51 are firmly fastened to the above-mentioned upper tubes 2L, 2R below top shelters 71L (see FIG. 3), 71R and the main sheet 10.

Figure 3:
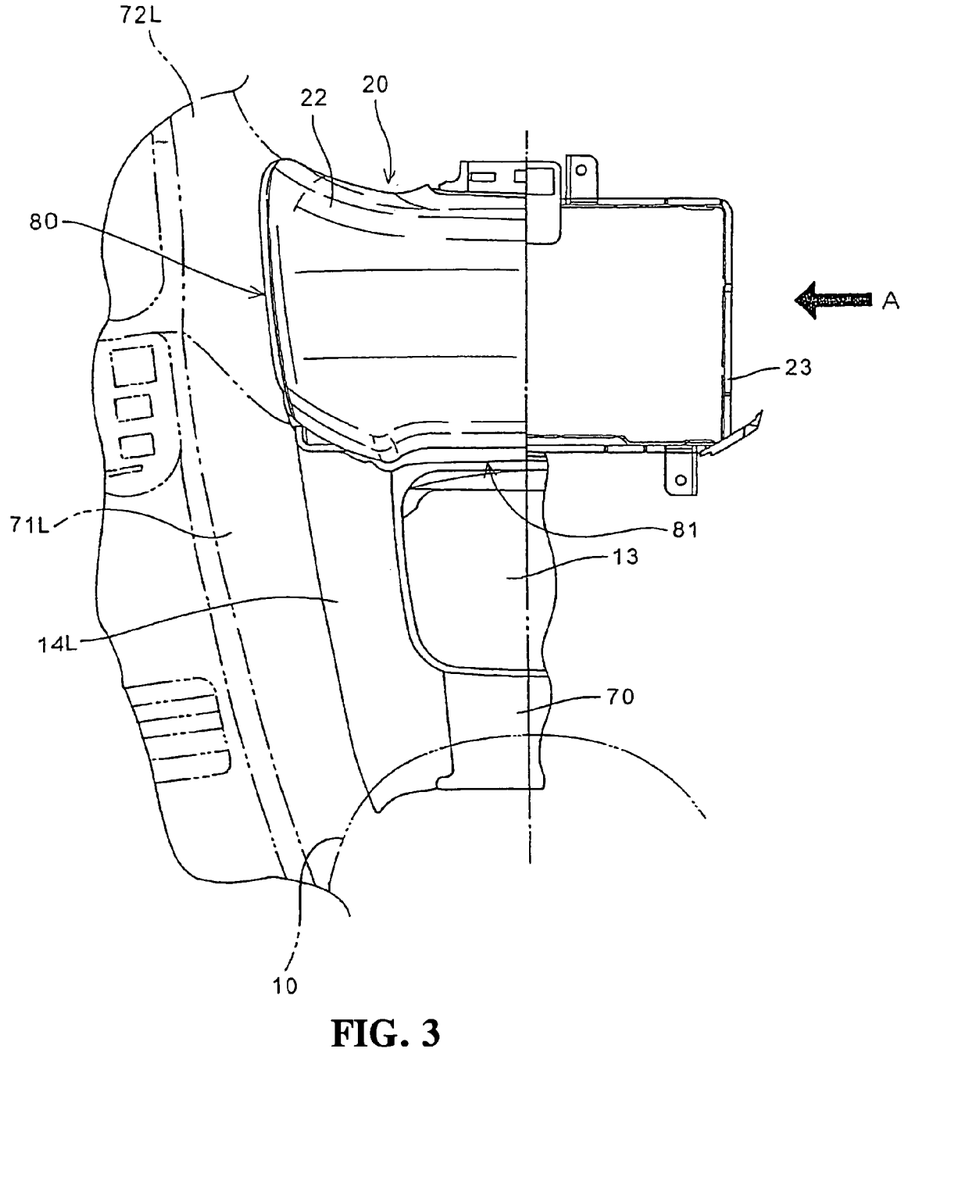
FIG. 3 is a top plan view showing the construction of an air bag module and a periphery thereof.

FIG. 3 is a top plan view showing the construction of the air bag module 20 and the surrounding thereof. The symbols equal to the symbols used above indicate parts identical or similar to the parts described above. The air bag module 20 according to this embodiment has a substantially symmetrical construction in the left and right direction. The right half of the drawing shows the casing 23 which is formed into a box-like shape and is made of metal or the like. A plate-like extending portion (see FIG. 4) extending along four side walls consisting of front, rear, left and right side walls of the casing 23 is formed on a back surface side of the module cover 22 made of a resin or the like. Tear lines constituting fragile portions that are broken upon the inflation and the deployment of the air bag 50 are not formed in a surface of the top plate member of the module cover 22 but are formed in three side surfaces except for the side surface on a vehicle body front side out of front, rear, left and right extending portions. Due to the above-mentioned construction, upon the inflation and the deployment of the air bag 50, the side tear lines (see FIG. 5) formed in the directions along the left and right side end portions 80, 80 and a rear tear line which is formed in the direction along the rear end portion 81 are broken. Thus, the module cover 22 is deployed about the extending portion on the vehicle body front side as an axis of rotation. A top shelter center 70 constitutes an external part that is arranged at a portion of the vehicle body behind the oil-filling-port lid 13.

The left and right side end portions 80, 80 of the module cover 22 extend to the outside in the vehicle width direction so that the side tear lines cannot be observed from the outside. At the same time, the side end portions 80, 80 are engaged with the end portions of the front shelters 72L, 72R (see FIG. 2). Thus, an engaging portion between both portions forms an integral surface. Due to the above-mentioned construction, the tear lines are not directly brought into contact with moisture in the outside air or dust or an unpredicted external force or the like. At the same time, the appearance around the module cover 22 and the texture of the module cover 22 can be enhanced.

Figure 4:
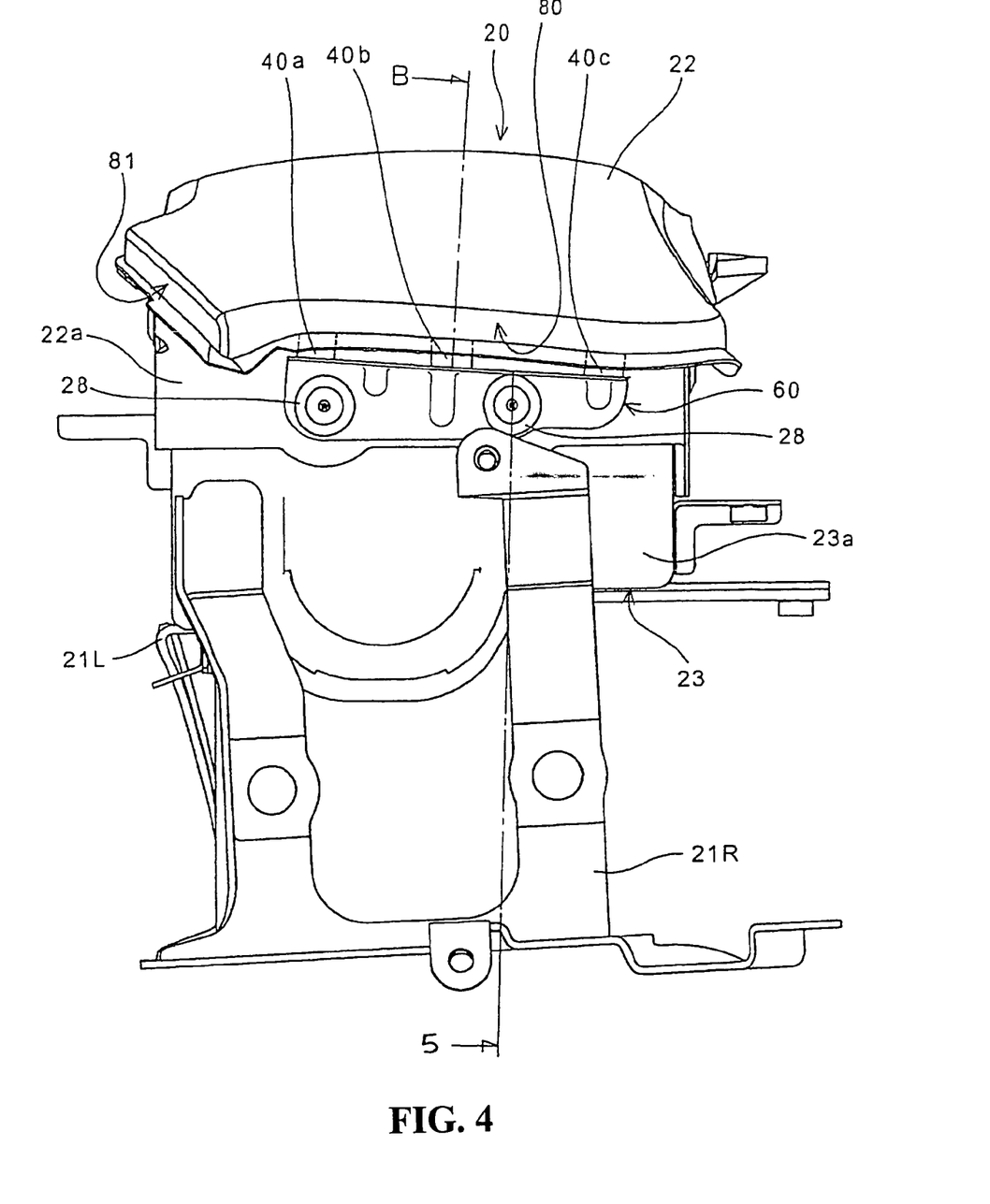
FIG. 4 is a side view of the air bag module as viewed in the direction A in FIG. 3.

FIG. 4 is a right side view of the air bag module 20 as viewed in the direction A in FIG. 3. The symbols equal to the symbols used above indicate parts identical or similar to the parts described above. The air bag module 20 according to this embodiment has a substantially symmetrical construction in the left and right direction with respect to the vehicle body center axis. Thus, unless otherwise specified, matters described hereinafter are commonly applicable to left-side and right-side constructions. The air bag module 20 includes the two-arm-type right support stay 21R connected to a right side wall 23R of the casing 23 and a one-arm-type left support stay 21L connected to a left side wall (see FIG. 5) of the casing 23 and is mounted to stride over the upper tubes 2L, 2R (see FIG. 5) of the motorcycle 1.

The module cover 22 and the casing 23 are fixedly supported by caulking rivets 28 which penetrate both parts. Further, although the right extending portion 22a and the right side wall 23R are overlapped to each other and are connected to each other using two rivets 28 in the drawing, three other side surfaces are also connected using a plurality of rivets 28 in the same manner. A top plate member of the module cover 22 is formed in an approximately arcuate shape such that a center portion thereof in the vehicle width direction assumes the highest position and the height is gradually lowered toward the left and right side end portions 80, 80.

The module cover 22 according to this embodiment includes the following construction. That is, three plate-like ribs 40a, 40b, 40c which are formed approximately parallel to the right extending portion 22a are mounted on the side end portion 80. Further, a bracket 60 having an approximately L-shaped cross section is mounted on the right extending portion 22a using the rivets 28, while lower end portions of the ribs 40a, 40b, 40c support an upper surface portion of the bracket 60. The above-mentioned construction is also applied to the left side of the module cover 22 in the same manner.

Figure 5:
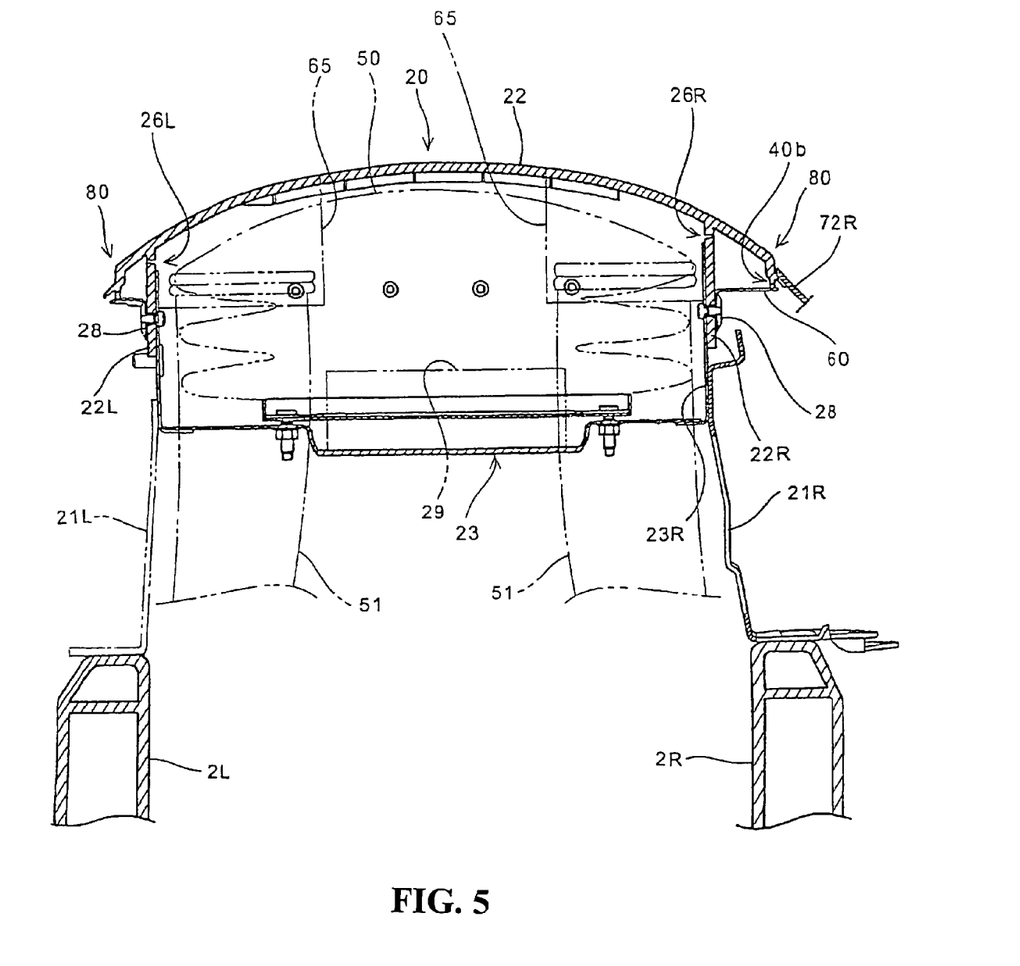
FIG. 5 is a cross-sectional view taken along a line 5-5 in FIG. 4.

FIG. 5 is a cross-sectional view taken along a line 5-5 in FIG. 4. The symbols equal to the symbols used above indicate parts identical or similar to the parts described above. As has been described above, the air bag module 20 is mounted over the upper tubes 2L, 2R using the left support stay 21L and the right support stay 21R in a striding manner. Further, as has been described above, in the inside of the casing 23, the inflator 29 and the folded air bag 50 are stored, and the support belts 51 which are connected to the back surface side of the air bag 50 are folded several times in the inside of the storing spaces 65, 65. Thereafter, the casing 23 is respectively fastened to the upper tubes 2L, 2R which are arranged on the vehicle rear side behind the cross-sectional position shown in the drawing. The support belt 51 may be stored in the storing space 65 without being folded. As has been described above, although the right side tear line 26R is formed in the right extending portion 22R of the module cover 22, the left side tear line 26L is formed in the left extending portion 22L in the same manner. The air bag module 20 according to the invention has a substantially symmetrical construction in the left and right direction with respect to the vehicle body center axis. Thus, the explanation will be made hereinafter by focusing on the construction at the right side of the drawing.

The bracket 60 which is formed of a thin-plate or the like and is made of metal that is integrally connected to the right extending portion 22R and the right side wall 23R using the rivets 28. The bracket 60 is configured such that one end portion thereof is arranged along the right side wall 23R and another end portion thereof is folded toward the outside in the vehicle width direction. Further, a lower end portion of the rib 40b, which is formed on the side end portion 80, is brought into contact with an upper surface of another end portion of the bracket 60. Due to such a construction, even when an external force is applied to the side end portion 80, a distal end of the rib 40b is caught and supported by the bracket 60. Thus, it is possible to prevent deformation such as the indentation of the side end portion 80. Further, even when the side end portion 80, made of a resin or the like, is slightly softened by being exposed to the radiation of direct sun light, heat from an engine or the like, it is possible to prevent the downward curving of the side end portion 80, the deflection of the side end portion 80 or the like thus preventing the lowering of the tear line protecting function and the appearance. Further, since the bracket 60 which supports the rib is fixedly supported by the plurality of rivets 28, the size accuracy of the upper end surface thereof can be managed easily. Thus, the accuracy of a mating surface between the side end portion 80 and the right front shelter 72R or the like can be enhanced. The rear end portion 81 (see FIG. 3) of the module cover 22 is formed along an arc which the top plate member of the module cover 22 draws and has a relatively high rigidity due to this structure. Thus, the above-mentioned support structure, which uses the ribs and the bracket, is no longer necessary. Further, the extending portions of the module cover 22 toward a front side and a rear side are respectively connected to the side walls on the front side and the rear side of the casing 23 using four rivets 28.

Figure 6:
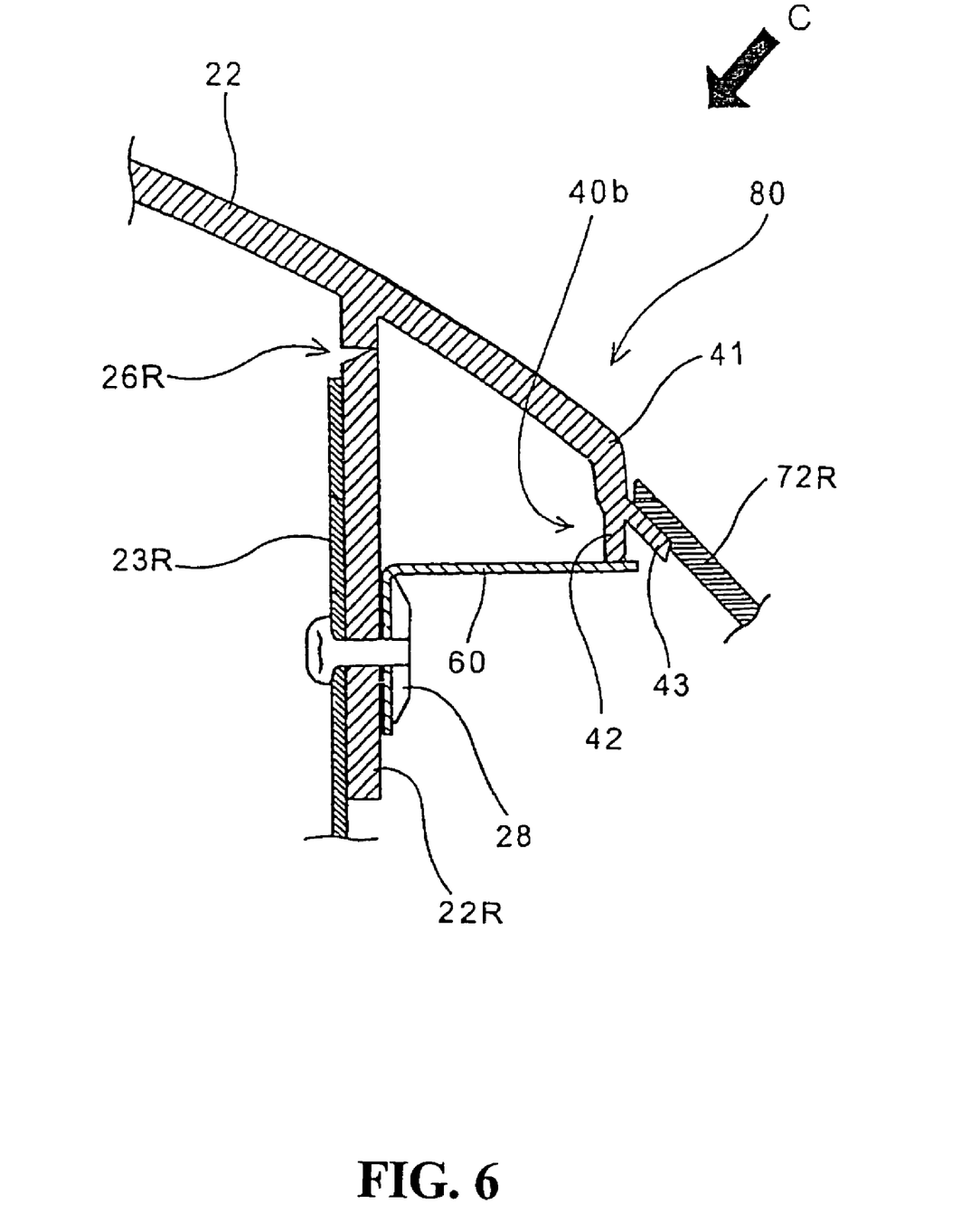
FIG. 6 is a partially enlarged view of FIG. 5.

FIG. 6 is a partially enlarged view of FIG. 5. The symbols equal to the symbols used above indicate parts identical or similar to the parts described above. The rib 40b is integrally formed on a distal end of side end portion 80 which is downwardly bent at a bent portion 41. The rib 40b has an eaves member 43 which is formed in a state wherein the eaves member 43 has a thickness smaller than a thickness of the support plate 42 in the vicinity of the support plate 42 which is arranged approximately parallel to the right extending portion 22R. The eaves member 43 is configured such that, in a normal state, the eaves member 43 is brought into contact with the back surface side of the right front shelter 72R without forming a gap therebetween thus preventing the intrusion of moisture, dust or the like. When the air bag 50 is inflated and deployed, the eaves member 43 is immediately deflected downwardly in FIG. 6 thus easily releasing the engagement of the eaves member 43 with the right front shelter 72R.

When an external force is applied from the direction indicated by an arrow C in the drawing, to prevent the side end portion 80 from being deformed, it may be possible to take a technique which mounts a rib perpendicular to the rib 40b on a back surface side of the side end portion 80. However, in the construction having the side tear lines as in the case of this embodiment, when the side end portion 80 and the right extending portion 22R are connected to each other, there arises a drawback wherein the breaking of the tear lines becomes difficult. To the contrary, the rib 40b according to this embodiment allows a portion of extending portion of the side end portion 80 to function as a rib. Thus, it is possible to prevent the side end portion 80 from being deformed without increasing the force necessary to break the tear line.

As has been described above, the vehicle-use air bag module of the invention is configured such that the ribs formed on the side end portions of the module cover are supported from below by the bracket fixed to the wall surface of the casing in which the air bag is stored. Accordingly, it is possible to obtain the air bag module in which the side end portions of the module cover are only slightly indented or deflected even when an unpredicted external force or heat is applied to the module cover.

It is needless to say that the shape of the side end portion of the module cover, the shape and number of the rib and the shape of the bracket which support the rib are not limited to the above-mentioned embodiments, and various modification can be made.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A vehicle-use air bag module comprising:
   a casing for housing an air bag;
   a module cover for covering an opening portion of the casing;
   an extending portion formed on a back surface side of the module cover in an erected manner;

a tear line formed in the extending portion;
a side end portion of the module cover expanding outward from the extending portion; and
a bracket directly supporting the side end portion from below;
wherein the extending portion, the bracket and a side wall of the casing are joined to each other.

2. The vehicle-use air bag module according to claim 1, wherein a plate-like rib is formed to be approximately parallel to the extending portion and is brought into contact with an upper surface side of the bracket mounted on the side end portion.

3. The vehicle-use air bag module according to claim 2, wherein a plurality of ribs is mounted on the side end portion.

4. The vehicle-use air bag module according to claim 2, wherein the joining of the extending portion, the bracket and the side wall of the casing is performed by caulking rivets.

5. The vehicle-use air bag module according to claim 4, wherein the joining using the rivets is performed at a plurality of portions.

6. The vehicle-use air bag module according to claim 2, wherein the ribs are arranged in symmetry at the left and right side end portions of the module cover.

7. The vehicle-use air bag module according to claim 6, wherein an eaves member is mounted on a side periphery of the rib, and the eaves member is configured to be in contact with a surface of a backside of an exterior part adjacent to the module cover.

8. The vehicle-use air bag module according to claim 2, wherein an eaves member is mounted on a side periphery of the rib, and the eaves member is configured to be in contact with a surface of a backside of an exterior part adjacent to the module cover.

9. The vehicle-use air bag module according to claim 1, wherein a plurality of ribs is mounted on the side end portion.

10. The vehicle-use air bag module according to claim 9, wherein the joining of the extending portion, the bracket and the side wall of the casing is performed by caulking rivets.

11. The vehicle-use air bag module according to claim 10, wherein the joining using the rivets is performed at a plurality of portions.

12. The vehicle-use air bag module according to claim 9, wherein the ribs are arranged in symmetry at the left and right side end portions of the module cover.

13. The vehicle-use air bag module according to claim 9, wherein an eaves member is mounted on a side periphery of the rib, and the eaves member is configured to be in contact with a surface of a backside of an exterior part adjacent to the module cover.

14. The vehicle-use air bag module according to claim 1, wherein the joining of the extending portion, the bracket and the side wall of the casing is performed by caulking rivets.

15. The vehicle-use air bag module according to claim 14, wherein the joining using the rivets is performed at a plurality of portions.

16. The vehicle-use air bag module according to claim 15, wherein the ribs are arranged in symmetry at the left and right side end portions of the module cover.

17. The vehicle-use air bag module according to claim 15, wherein an eaves member is mounted on a side periphery of the rib, and the eaves member is configured to be in contact with a surface of a backside of an exterior part adjacent to the module cover.

18. The vehicle-use air bag module according to claim 14, wherein the ribs are arranged in symmetry at the left and right side end portions of the module cover.

19. The vehicle-use air bag module according to claim 14, wherein an eaves member is mounted on a side periphery of the rib, and the eaves member is configured to be in contact with a surface of a backside of an exterior part adjacent to the module cover.

20. The vehicle-use air bag module of claim 1, wherein a portion of the bracket contacts the side end portion from below.

21. A vehicle-use air bag module comprising:
a casing for housing an air bag;
a module cover for covering an opening portion of the casing;
an extending portion including at least one tear line formed therein, said extending portion being formed on a back surface side of the module cover in an erected manner;
a side end portion of the module cover being displaced relative to the extending portion expanding outward therefrom and into engagement with a portion of a vehicle for forming a seal therebetween for preventing the tear line from coming into exposure with debris or moisture; and
a bracket directly supporting the side end portion from below.

22. The vehicle-use air bag module of claim 21, wherein a portion of the bracket contacts the side end portion from below.

23. The vehicle-use air bag module according to claim 21, wherein a plate-like rib is formed to be approximately parallel to the extending portion and is brought into contact with an upper surface side of the bracket mounted on the side end portion.

* * * * *